(12) United States Patent
Dixit et al.

(10) Patent No.: US 10,025,447 B1
(45) Date of Patent: Jul. 17, 2018

(54) MULTI-DEVICE USER INTERFACE

(71) Applicant: Amazon Technologies, Inc., Seattle, WA (US)

(72) Inventors: Aditi Chandrashekhar Dixit, San Jose, CA (US); Pieter Sierd van der Meulen, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 14/745,228

(22) Filed: Jun. 19, 2015

(51) Int. Cl.
| | | |
|---|---|---|
| A63F 9/24 | (2006.01) | |
| G06F 3/048 | (2013.01) | |
| A63F 13/825 | (2014.01) | |
| A63F 13/25 | (2014.01) | |
| A63F 13/424 | (2014.01) | |
| A63F 13/533 | (2014.01) | |
| A63F 13/34 | (2014.01) | |

(52) U.S. Cl.
CPC .............. *G06F 3/048* (2013.01); *A63F 13/25* (2014.09); *A63F 13/34* (2014.09); *A63F 13/424* (2014.09); *A63F 13/533* (2014.09); *A63F 13/825* (2014.09)

(58) Field of Classification Search
CPC ...... G06F 3/048; A63F 13/323; A63F 13/825; A63F 2300/403; A63F 2300/5553; A63F 13/25
See application file for complete search history.

(56) References Cited

U.S. PATENT DOCUMENTS 6,408,272 B1    6/2002   White et al.

| 2013/0194278 A1* | 8/2013 | Zajac, III ................ A63F 13/10 345/473 |
| 2013/0290876 A1* | 10/2013 | Anderson ............. G06T 19/006 715/761 |
| 2014/0108019 A1 | 4/2014 | Ehsani et al. |
| 2014/0289362 A1* | 9/2014 | Itoh ....................... H04W 4/001 709/217 |
| 2015/0120296 A1 | 4/2015 | Stern et al. |

FOREIGN PATENT DOCUMENTS

EP          2699015 A1 *  2/2014   ....... H04N 21/42203

OTHER PUBLICATIONS

Office action for U.S. Appl. No. 14/750,151, dated Apr. 13, 2017. Ghosh, "Allocation of Local and Remote Resources for Speech Processing", 13 pages.
Office Action for U.S. Appl. No. 14/750,151, dated Oct. 19, 2107, Ghosh, "Allocation of Local and Remote Resources for Speech Processing", 14 pages.

* cited by examiner

*Primary Examiner* — Steve Rowland
(74) *Attorney, Agent, or Firm* — Lee & Hayes, PLLC (57) ABSTRACT

This disclosure is directed to migrating an avatar from a first computing device to a second computing device during a user interaction with the avatar, such as during a user-support session with the avatar. Migration includes depicting the avatar on the first device at a first time and then terminating the avatar on the first device and displaying the avatar on a second, different device at a second time. In some embodiments, the avatar may be migrated along with content. The first device may transfer data to the second device using a peer-to-peer transfer. In some embodiments, a remote computing device may facilitate the migration of the avatar and content between devices.

20 Claims, 8 Drawing Sheets

MULTI-DEVICE USER INTERFACE

BACKGROUND

Computing devices have become commonplace in almost every environment. For example, mobile telephones, laptop computers, and tablet computers are commonly used for work and pleasure and accompany people in many daily activities. People often travel with computers and mobile phones and use these devices in public places. However, computing devices are often designed for different purposes. Some computing devices are better served for some purposes, such as displaying a movie while other computing devices may be better served for displaying an electronic book, for example.

In some instances, a user may desire to start interacting with content on a first device and then continue interacting with that content on a second device. Provided herein are technical solutions to problems related to interacting with content on multiple devices, among other things.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure includes migrating an avatar from a first computing device to a second computing device during a user interaction with the avatar, such as during a user-support session with the avatar. In some embodiments, the avatar may be migrated along with content. For example, a user may begin to interact with a video on a tablet computing device. During this interaction, or possibly beforehand, the user may interact with an avatar, which may assist the user with finding the video, playing the video, adjusting preferences of the video, and/or performing of other tasks. The user may then cause the video to be displayed or moved (migrated) to the second computing device, such as a television. In some embodiments, the avatar may assist in the migration of the video to the television, such as in response to a user voice command that includes an instruction to display the video on the television. The television may receive a command, possibly from the tablet computing device or from another computing device (e.g., a remote computing device, etc.), which may cause the television to load the video and begin to play the video. The television may also receive another command, possibly from the tablet computing device or from another computing device (e.g., a remote computing device, etc.), which may cause the television to display the avatar and continue to assist the user with the avatar displayed on by the television instead of on the tablet computing device. Thus, the avatar may migrate from the tablet computing device to the television to continue to assist the user with the content (i.e., the video) and/or with other tasks. In some embodiments, the avatar may migrate before the content and then assist the user with migration of the content and/or with other tasks.

In some embodiments, the migration of the avatar may be coordinated to create a visually consistent and visually appealing user experience. For example, the avatar that assists the user on a tablet computing device may be depicted as a monkey that has a female voice. The avatar, through animation, may visually exit the tablet computer by swinging from a virtual rope. To create a consistent and appealing experience, the television may depict the same monkey (avatar) as swinging into the display area of the television. The monkey may include the same female voice when provided by the television as the monkey included when provided by the tablet computing device.

In various embodiments, the first computing device may continue to perform some operations associated with the avatar and/or the content after the avatar and the content are transferred (displayed, handed-off) to the second computing device. For example, the first computing device may include a microphone used to receive voice commands for the avatar while the second computing device may not include a microphone. In such instances, the first computing device may continue to receive signals from the microphone by keeping the microphone "live" and providing the signals (or processed data) to the second computing device, possibly through a remote computing device. As another example, the first computing device may have high quality speakers while the second computing device may include no speakers or lower quality speakers. In such instances, the first computing device may continue to output audio from the high quality speakers, which may be fed audio information from the second computing device, possibly through a remote computing device. Of course, other components (hardware, software, or both) may be shared in a similar fashion.

The techniques and systems described herein may be implemented in a number of ways. Example implementations are provided below with reference to the following figures.

Figure 1:
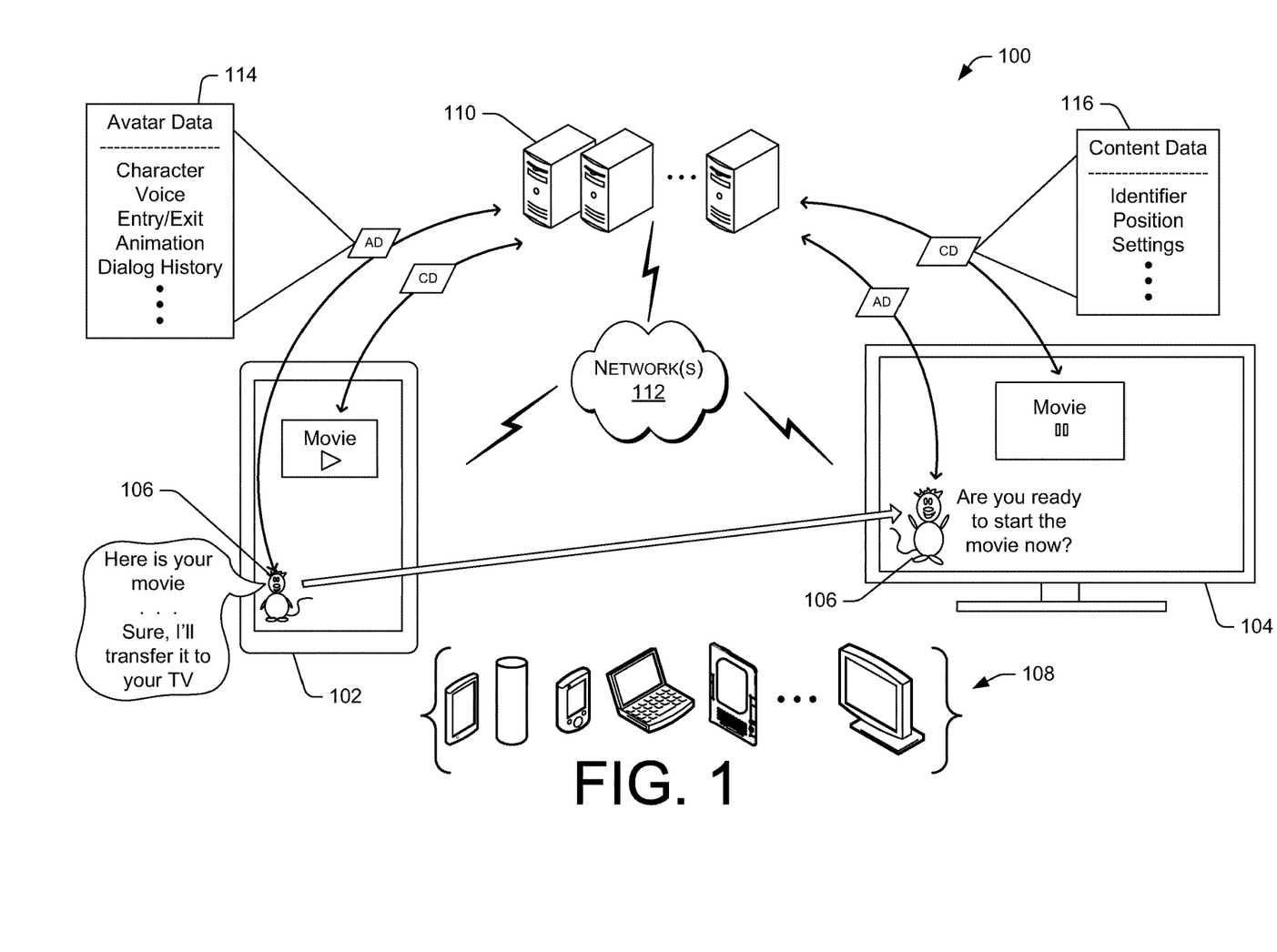
FIG. 1 is a schematic diagram of an illustrative computing environment that facilitates avatar migration from a first device to a second device.

FIG. 1 is a schematic diagram of an illustrative computing environment 100 that facilitates avatar migration. The environment 100 may include a first device 102 and a second device 104, which may be used by a user during interaction with an avatar 106. The first device 102 and the second device 104 may be selected from electronic devices 108 that include at least some output components (e.g., a display, a speaker, lights, etc.) and at least some input components (e.g., a touchscreen, a microphone, a keyboard, a trackpad, a remote control, etc.). Non-limiting examples of the electronic devices 108 may include a tablet computing device, a microphone array and speaker system that performs speech recognition, a mobile telephone and/or smartphone, a portable computer, an electronic book reader, a television and/or smart television, a remote control, and/or a set top box or other television control box. The first device 102 may be a same type of device as the second device 104 or a different type of device than the second device 104. For example, the first device 102 and the second device 104 may both by gaming devices which may be similar or the same, and possibly used during a multiplayer game. As discussed below in many examples, the first device 102 may be different than the second device 104, which may result in the user switching from the first device 102 to the second device to exploit advantages of the second device (e.g., portability, display size, etc.).

The environment may include a remote computing device 110 in communication with the first device 102 and the second device 104 via one or more networks 112. The networks 112 may include wired networks, wireless networks, or both, which facilitate exchange of at least data between connected devices. In some embodiments, the remote computing device 110, which may be implemented in a distributed or cloud services configuration, may provide at least some data and/or content to the first device 102 and/or the second device 104. The remote computing device 110 may coordinate transfer of content or transfer of playback of content from the first device 102 to the second device 104, or vice versa. For example, the remote computing device 110 may stream content (e.g., a movie, a song, etc.) to the first device 102 for a first period of time. The remote computing device 110 may then receive a request to switch the playback to the second device 104, and discontinue the playback on the first device 10. In turn, the remote computing device 110 may then stream the content to the second computing device 104, possibly coordinating an initial point of the continued streaming to minimize interruption to the user and minimize loss of content such that the user misses or does not see/hear a portion of the content during the switching from the first device 102 to the second device 104. As discussed herein, the terms "transfer" and "handoff" includes changing playback of the content from the first device to the second device, which may include transferring a physical file or set of files, may include streaming content to a different device, or may cause local content stored on the devices to be accessed independently.

Meanwhile, the avatar 106 may provide user-support by responding to commands and/or by interacting with the user through command tasks and/or a conversation dialog to assist the user with a task, answer questions, and/or perform other operations. The avatar may be depicted to the user by a visible animated character having a character profile, by a voice having a voice profile, or by both depending on the hardware capabilities of an output device, such as the first device 102 or the second device 104. The avatar may be executed and rendered by an avatar manager or engine, which may be configured to perform automated speech recognition (ASR) and natural language understanding (NLU), which may then be used to perform searches, respond to questions or provide other dialog by performing text-to-speech conversion, possibly while providing some visual animation to complement verbal dialog. For example, the avatar 106 may be depicted as a monkey, or virtually any other type of character, and may be animated to move around, wiggle a tail, smile, wink, and/or provide other non-verbal communication, for example.

In accordance with one or more embodiments, the avatar 106 may migrate, or otherwise move or transfer from the first device 102 to the second device 104, such as before, after, or during a transfer of content from the first device 102 to the second device 104 as described above. For example, a user may interact with the first device 102 and may ask the avatar 106 rendered on the first device to find a movie, which is an example of the content. The user may then ask the avatar to play the movie on the television, which may be the second device 104. The first device, possibly using the remote computing device, may process these commands using ASR and natural language understanding (NLU). Up until this point in time, the movie and the avatar may not be displayed on the second device 104. However, after transferring the movie and migrating the avatar, as discussed in detail below, the second device may begin to play the move and interact with the user via the avatar while the first device 102 may terminate playback of the move and terminate use of the avatar. The migration of the avatar may be performed in such a manner as to create an appearance to the user that the avatar has traveled from the first device 102 to the second device 104 to resume the assistance to the user, which may be performed by visual animation, audible sounds, or both. Details of data exchanges between the various described devices is provided in more detail in illustrative processes shown in FIGS. 3-8 and described below.

As shown in FIG. 1, the avatar data 114 may be migrated between the first device 102 and the second device 104. The avatar data 114 may include information such as a character profile (i.e., type of animated character), a voice profile (i.e., type of voice and characteristics), exit and entry animation and locations, dialog history, and/or other relevant information as discussed below. By sharing this information between devices, the second device 104 may cause a familiar avatar to be presented to the user which is the same or similar to the avatar previously presented to the user via the first device 102. Content data 116 may be provided to/from the first device 102 and/or the second device 104 to facilitate playback and transfer of the content between the devices. The content data 116 may include an identifier of the content, display characteristics, display settings, volume settings, preferences, playback location information, and/or other information used to present the content to the user at the first device 102 and then at the second device 104.

Although FIG. 1 shows use of the remote computing device 110, the transfer of the content and migration of the avatar 106 may be performed in a peer-to-peer (P2P) network environment, which is discussed in more detail below. Additional details about the first device 102, the second device, 104, and the remote computing device 110 are provided below with reference to FIGS. 2A and 2B.

Figure 2A:
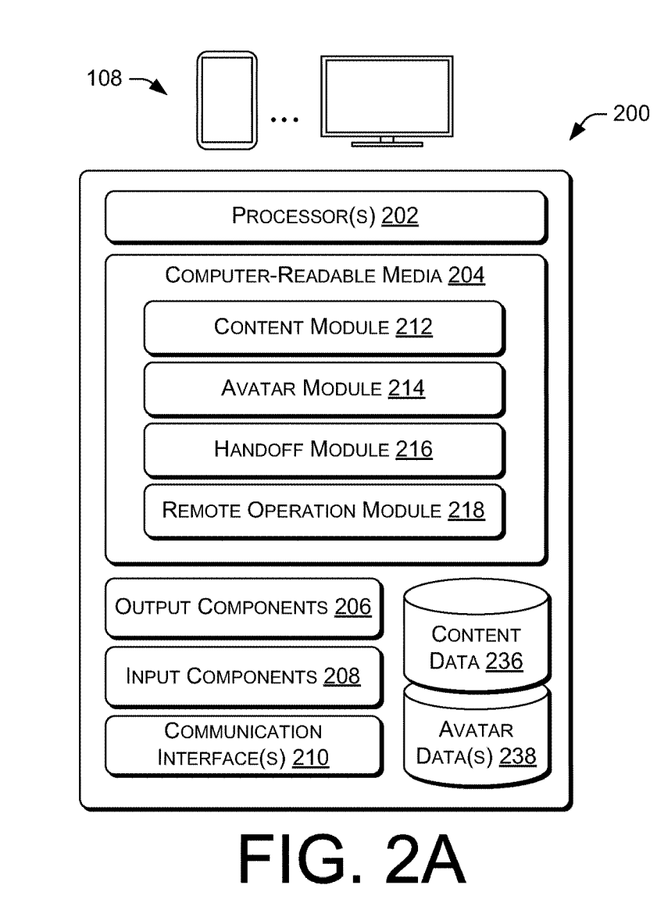
FIG. 2A is a block diagram of illustrative computing architecture of one or more different user devices.

FIG. 2A is a block diagram of illustrative computing architecture 200 of one or more different user devices, such as the first user device and/or the second user device shown in FIG. 1. The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the first device 102 and/or the second device 104 (or for any one of the electronic devices 108).

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computing architecture 200 may include output components 206, input components 208, and communication interfaces 210. The output components 206 may include a display, a speaker, lights, haptic feedback, and/or other devices that provide sensory information to a user. The input components 208 may include a touchscreen, a microphone a keyboard, a trackpad, a remote control, and/or other devices that convert user actions into input signals that are understandable by a computing device. The communication interfaces 210 may enable exchange of information with other devices and/or the remote computing device 110 via the networks 112. The communication interfaces 210 may include radio transceivers, optical communication devices, and/or other types of interfaces that facilitate transmission, receipt, and/or exchange of data.

In some embodiments, the computer-readable media 204 may store a content module 212, an avatar module 214, a handoff module 216, and a remote operation module 218, which are described in turn. The components may be stored together or in a distributed arrangement.

The content module 212 may access, playback, or otherwise interact with content to be output or manipulated by the device. For example, the content may be a movie. The content module 212 may be an application that retrieves the movie, plays the movie, and enables user control of at least some aspects, such as preferences, location, and other aspects of the movie. The content may be a file that is created or modified by the user, such as a text document or image. Here, the content module 212 may retrieve the file, enable user interaction and/or manipulation of the file, and store the file so save changes. The content, therefore, may be virtually any data that can be accessed by the device and output in some manner to a user. The content may be served to the device from another source, such as streamed from the remote computing device 110 or another device. However, the content may be saved local to the device, in some instances.

The avatar module 214 may generate and/or cause output of an avatar that is used to provide user-support to a user of the device. The avatar module 214 may provide user-support by responding to commands and/or by interacting with the user through a conversation dialog to assist the user with a task, answer questions, and/or perform other operations. The avatar module 214 may depict the avatar to the user using a visible animated character having a character profile, using a voice having a voice profile, or using both depending on the hardware capabilities of the device. The avatar module 214 may exchange information with a complementary avatar manager of the remote computing device 110, which may perform at least some processing of data to assist the avatar module 214 in fulfilling a user request. The avatar module 214 may be configured to perform ASR, NLU, and then perform searches (possibly processed by the remote computing device 110) and/or respond to questions or provide other dialog by performing text-to-speech conversion (possibly processed by the remote computing device 110), while providing some visual animation to complement verbal dialog.

The handoff module 216 may enable a handoff, which includes transfer, migration, or other change of output of information (e.g., the content, the avatar, or both) from one device to another device. The handoff module 216 may be configured to receive a request to transfer content from the first device 102 to the second device 104, as discussed above with reference to FIG. 1, or vice versa. The handoff module 216 may receive a request from the user to perform the handoff, such as through a selection, through a command spoken to the avatar and processed by ASR, and/or using other communications. The handoff module 216 may cause the handoff to be performed via a P2P communication with another device and/or by transmitting a communication to the remote computing device 110, which may then serve or otherwise transfer or migrate information (e.g., the content, the avatar, or both) to the second device. Techniques of carrying out the handoff are described below in the various flow diagrams discussed below.

The remote operation module 218 may facilitate use of an input or output component for the benefit of another device that receives the handoff. For example, when the avatar is handed off to the second device 104, but the second device does not include a microphone, the first device 102 may continue to keep a microphone "live" or active to convert sound into signals. The remote operation module 218 may keep the microphone active at least while the avatar is in use (as determined by information from the second device), and transmit the signals to the remote computing device 110 or possibly directly to the second device 104 for processing by ASR and NLU, for example. The remote operation module 218 may use other hardware of the first device to facilitate operation of the avatar by the second device 104 and/or to enhance an experience with the content played by the second device, such as by using speakers of the first device 102 to output audio of the content and/or avatar played/rendered by the second device 104.

In some embodiments, the transfer of the content and migration of the avatar 106 may be performed in a peer-to-peer (P2P) network environment using the computing architecture 200. In such embodiments, the first device 102 may transfer a message to the second device 104 to instruct the second device to initiate use of an avatar. The avatar data may be stored locally on each device, and then may be called upon in response to the message and/or selected based on information included in the message. In some embodiments, the message may specify parameters for the avatar to be used by the second device, such as a character type, a voice type, an animation scenario, etc. The peer-to-peer network may be established by a wired or wireless network, such as by any of the networks 112 described above, including a Bluetooth® network, a Wi-Fi network, and other local networks.

Figure 2B:
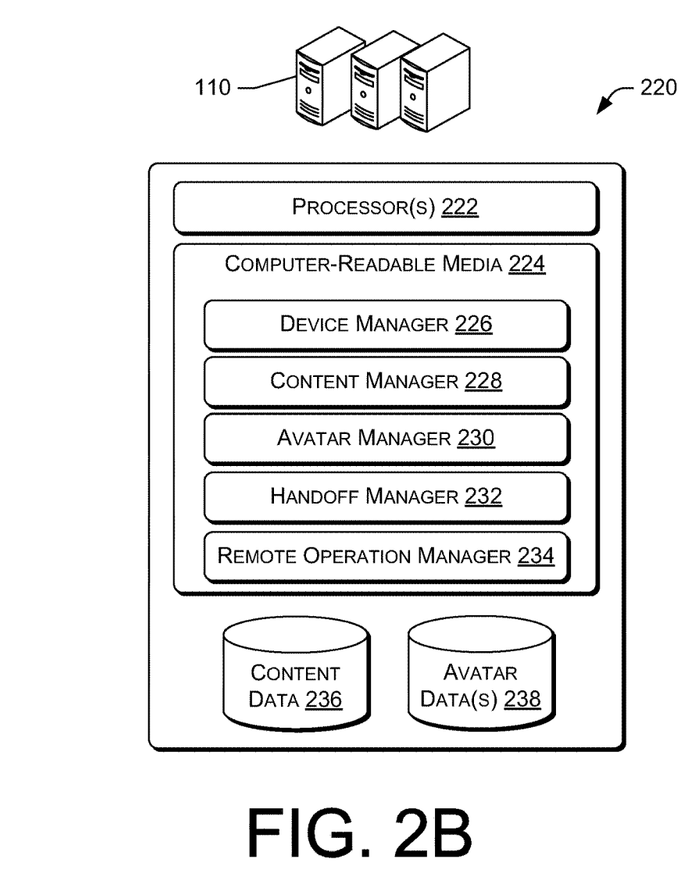
FIG. 2B is a block diagram of illustrative computing architecture of a remote computing device to facilitate the avatar migration.

FIG. 2B is a block diagram of illustrative computing architecture 220 of a remote computing device to facilitate the avatar migration. The computing architecture 220 may include one or more processors 222 and one or more computer readable media 224 that stores various modules, applications, programs, or other data. The computer-readable media 224 may include instructions that, when executed by the one or more processors 222, cause the processors to perform the operations described herein for the remote computing device 110. The computing architecture 220 may be implemented in a non-distributed computing environment or in a distributed computing environment (e.g., a cloud services computing environment).

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 224 may store a device manager 226, a content manager 228, an avatar manager 230, a handoff manager 232, and a remote operation manager 234, which are described in turn. The components may be stored together or in a distributed arrangement. The computing architecture 220 may also store content data 236 (e.g., the movies, documents, files, etc.) and avatar data(s) 238. The avatar data may include character profiles (e.g., a monkey, a giraffe, a clown, a car, a circuit board, etc.), voice profiles (e.g., different male and female sounding voices), animation sequences, and so forth.

The device manager 226 may determine which devices are available for use by the handoff manager 232 for handoff of the content and/or the avatar as discussed herein. For example, the device manager 226 may determine that the first device 102 and the second device 104 are located in a same house, a same room, within a threshold distance, or otherwise under control of a same user. The device manager 226 may determine the location of devices by communicating with those device, through triangulation of signals, through optical detection, and/or by other locating techniques. In some embodiments, the device manager 226 may maintain a registration or log of devices and respective relationships with other devices, which may be updated in response to request from the user. In various embodiments, the device manager 226 may determine a device status based in interacting with the device (e.g. sending a pinging signal, etc.), through user input, and/or from information from another device, such as from the first device 102 that may capture information about the second device 104 via one of the input components 208, such as a camera or radio receiver.

The content manager 228 may provide the content to a device, such as the first device 102 or the second device 104. The content manager 228 may provide resources to support the content module 212. In some embodiments, the content manager 228 may provide the content from the content data 236, such as by streaming the content to the device or otherwise providing access to the content. In some embodiments, the content manager 228 may store information about the content in the content data 236, such as a location in the content that has been consumed by the user (e.g., in the case of a video or music), and/or other information such as changes made by a user, output preferences, and so forth. The content data 236 may be used by the content manager 228 for output to a different device in response to a handoff, such as from the first device 102 to the second device 104.

The avatar manager 230 may provide resources to support the avatar module 214. The avatar manager 230 may provide ASR and/or NLU algorithms to support commands and/or dialog from a user through the avatar module 214. The avatar manager 230 may leverage avatar data(s) 238, which may include speech-to-text data, text-to-speech data, character profiles, voice profiles, and/or other data used to enable conversation and/or verbal command question/answer exchanges with a user of a device. The avatar data(s) 238 may include data for one or more avatars. The avatar manager 230 may receive information from the avatar module 214, such as a recording of a question or command from the user. The avatar manager 230 may then process the recording to determine a response, generate an audio signal for the response, generate an animation for the avatar, and then transmit the animation and the audio signal to the avatar module 214 for playback to the user as the response. The avatar manager 230 may store various other data in the avatar data, such as exit and entry points used by the avatar to exit/enter the devices during a migration, animation scenarios used for the exit/entry (e.g., jumping to other device, walking to other device, climbing to other device, riding a vehicle to another device, etc.). The avatar manager 230 may determine to terminate the avatar on the first device 102 and initiate the avatar on the second device using the avatar data, possibly in response to a command from the handoff manager 232.

The handoff manager 232 may communicate with the handoff module 216 to enable handoff, which includes transfer, migration, or other movement of information (e.g., the content, the avatar, or both) from one device to another device. The handoff manager 232 may receive a request to transfer content from the first device 102 to the second device 104, as discussed above with reference to FIG. 1, or vice versa. The handoff module 216 may receive a request from the handoff module 216, from the avatar manager 232, which may process a user request, and/or from other services. The handoff manager 232 may cause the handoff to be performed by serving or otherwise transferring or migrating information (e.g., the content, the avatar, or both) to the second device. Techniques of carrying out the handoff are described below in further detail.

The remote operation manager 234 may interact with the remote operation module 218 from one or more devices to facilitate use of an input or output component of one device for the benefit of another device that receives the handoff. For example, when the avatar is handed off to the second device 104, but the second device does not include a microphone, the first device 102 may continue to keep a microphone active or "live" to convert sound into signals. The remote operation manager 234 may instruct the first device to keep the microphone active at least while the avatar is in use (as determined by information provided by the remote operation manager 234), and transmit the signals to the remote computing device 110 for processing, possibly by the content manager 228 and/or by the avatar manager 230. remote operation manager 234 may determine other hardware of the first device to facilitate operation of the avatar by the second device 104 and/or to enhance an experience with the content played by the second device, such as by using speakers of the first device 102 to output audio of the content and/or avatar played/rendered by the second device 104. In some embodiments, the device manager 226 may track information about hardware of the various devices, and use this information to inform the remote operation manager 234, such as to indicate an absence of a microphone on a device or a preference for speakers on another device, among many possible examples.

In some embodiments, the computing architecture 200 may include the content data 236 and/or the avatar data(s) 238. For example, the computing architecture 200 may include the content data 236 and the avatar data(s) 238 when the computing architecture is configured to perform peer-to-peer communication with another device to migrate content and an avatar. Thus, the computer architecture 200 may optionally include any of the components shown in the computing architecture 220, which may be used to facilitate migration of content and/or the avatar.

FIGS. 3-8 show illustrative processes. Each process is illustrated as a collection of blocks in a logical flow graph, which represent a sequence of operations that can be implemented in hardware, software, or a combination thereof. In some processes, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
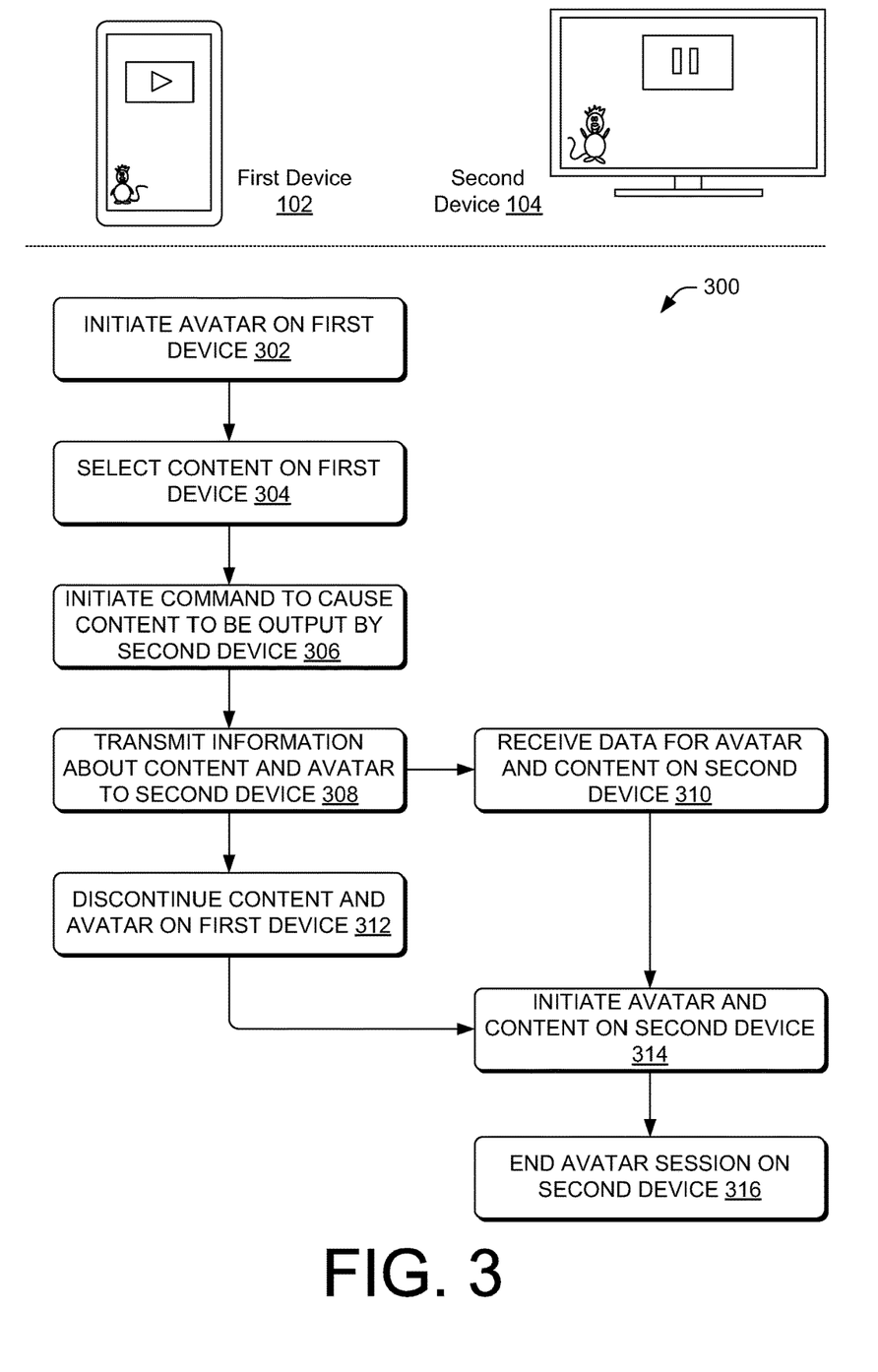
FIG. 3 is a flow diagram of an illustrative process of migrating an avatar and content from a first device to a second device.
Figure 4:
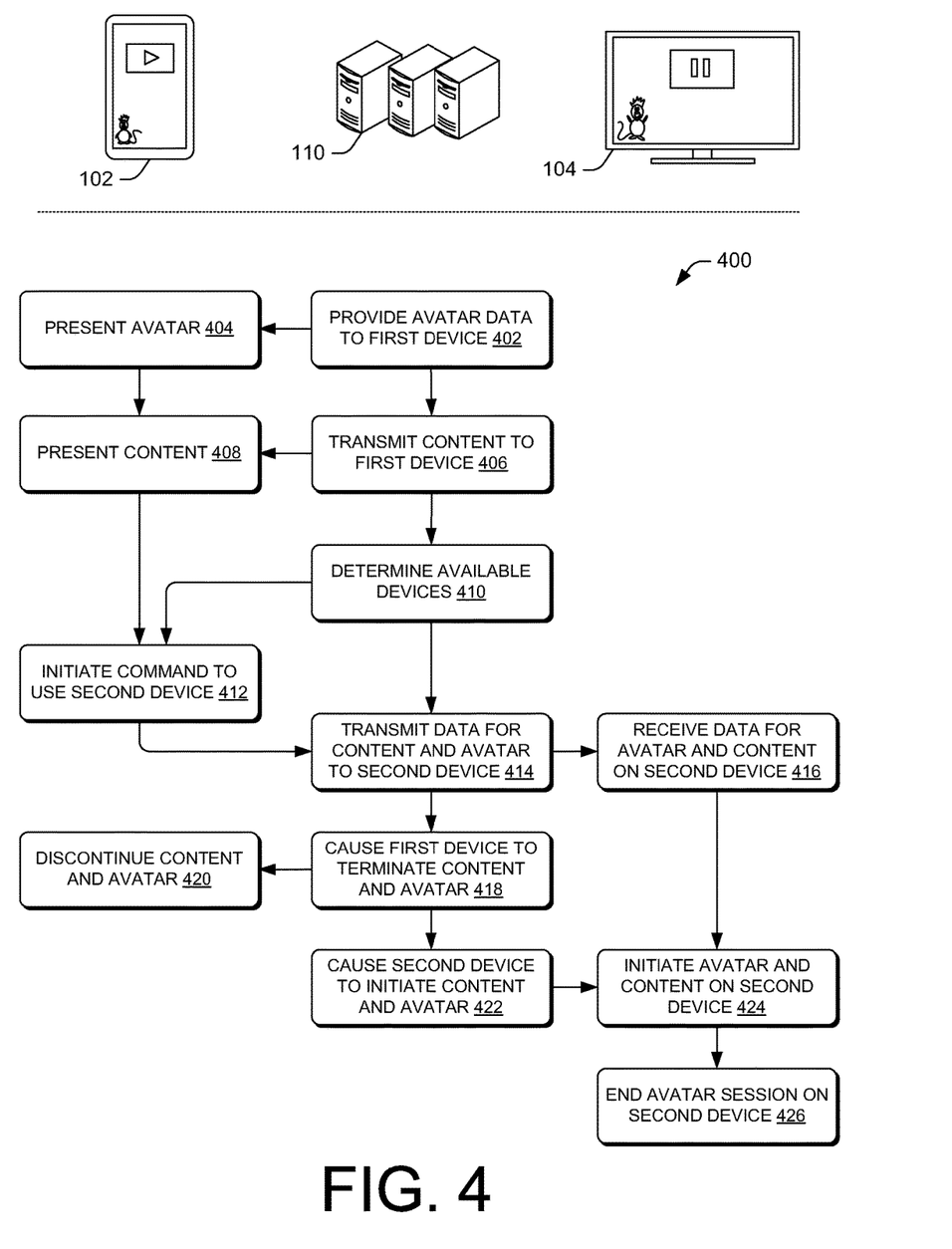
FIG. 4 is a flow diagram of another illustrative process of migrating an avatar and content from a first device to a second device using a remote computing device.

FIG. 3 is a flow diagram of an illustrative process 300 of migrating an avatar and content from a first device to a second device. The process 300 is described with reference to the environment 100 and may be performed by the first device 102 and the second device 104, possibly with assistance by the remote computing device 110. Of course, the process 300 may be performed in other similar and/or different environments. The process 300 shown high level interactions between the first device and the second device, which may be performed by a P2P exchange of data or possibly by an intermediary device, such as the remote computing device 110. However, FIG. 4 shows a detailed process that includes specific tasks that may be performed by the remote computing device 110.

At 302, the first device 102 may initiate the avatar for interaction with a user of the first device. For example, the first device may cause the avatar to appear in response to an audio file or audio stream associated with a user request (e.g., a wake word, a press of a control, etc.). The avatar may appear as an animated character, as a voice, or both. The first device may animate the avatar to appear to speak to the user using computer speech generated by a voice profile, such as to ask the user "How can I help you?" The user may ask the avatar to access, retrieve, or otherwise find a specified content.

At 304, the first device may select content for access by the user. The content may be selected via a request through the avatar as discussed above, which may be processed by ASR and NLU. In some embedment, the content may be selected manually by the user, such as by using one or more user interfaces to navigate to and select the content. The content may reside on the first device or on a different device, such as the remote computing device 110, the second device 110, and/or another device.

At 306, the first device may initiate a command to cause the content to be output by the second device. For example, the command may be received by the avatar (via the avatar module 214) by a command such as "Play the movie on my TV," processed by ASR. The command may be selected in other ways, such as by selecting a control in an application associated with the content, via an operating system of the device, and/or by other techniques.

At 308, the first device may transmit information about the content and the avatar to the second device, possibly via an intermediary device such as the remote computing device 110 or possibly directly via a P2P exchange of information. Prior to the transmitting, the first device 102 or the remote computing device 110 may determine an availability and/or an identity of the second device to receive the content and the avatar. The transmission may be via a token or a predetermined file having known data fields or code to initiate the transfer of information, such as avatar data and/or content data.

At 310, the second device 104 may receive data for the avatar and the content, possibly by reading from one of more files or tokens, and/or by processing code. For example, the second device 104 may receive at least some of the content data 236 and/or the avatar data(s) 238 when the remote computing device 110 is used to facilitate the transfer. When the content comes directly from the first device 102 to the second device 104, the second device 104 may receive relevant portions of data for the avatar and/or the content to continue dialog, playback, or other operations previously performed by the first device 102, but handed off to the second device. For example, the second device 104 may determine for the avatar, a character profile, a voice profile, an entry point of the avatar, an animation sequence for the entry, and prior dialog between the user and the avatar, which may be used to introduce the avatar on the second device and continue dialog or user assistance via the avatar.

At 312, the first device 102 may discontinue playback or interaction with the content and the avatar, which may or may not be discontinued at a same time. The discontinuance of the avatar may include the avatar performing an exit animation to "exit" from the first device 102 prior to entry at the second device 104.

At 314, the second device 104 may initiate the avatar and the content for interaction by the user, which may include rendering the content after reading the content provide by the first device or the remote computing device. The avatar and content may or may not be initiated at a same time. The initiation of the avatar may include causing an animation engine to render the avatar and perform an entry animation to "enter" the second device 104 after being discontinued from the first device. The avatar, executed by the avatar module 214, may then assist the user, such as by causing the content to be played back on the second device or otherwise made accessible on the second device 104, which may be performed by animation, ASR, NLU and/or other techniques. In some embodiments, the "assistance" by the avatar may be performed though animation, such as showing the user where the content is stored, which may assist the user in finding the content in the future.

The avatar initiated on the second device 104 may be a same avatar as the avatar rendered by the first device 102 or may be at least slightly different. For example, the avatar rendered by the second device may include some same or similar characteristics as the avatar rendered by the first device 102, such as a same or similar voice, appearance, animation sequence, and so forth, while having some different features (e.g., different clothing, different size, etc.) The avatar rendered by the second device may be different than the avatar rendered by the first device 102 based on various factors, such as limitations of respective computing devices (e.g., may be rendered as a two-dimensional avatar on one device and as a three dimensional avatar on another device, etc.). Devices without displays or other specific hardware may not provide certain depictions or characteristics of the avatar, which may be provided by another device that includes a display (or other specific hardware to provide a user-perceivable output such as speakers, haptic feedback, etc.). Thus, the avatar rendered by the first device 102 and then rendered by the second device 104 may be familiar to the user, but different is some ways as rendered by the different devices, which may include different hardware, different software, and so forth.

In accordance with one or more embodiments, a first avatar rendered by the first device 102 may be different than a second avatar rendered by the second device, but may be associated with the second avatar. For example, the first avatar may be of a same character type (e.g., both monkeys, but different colors, etc.). In some embodiments, the first avatar may introduce the second avatar, such as by rendering both avatars on a single device before or after the handoff of the content. For example, the first avatar may call the second avatar and ask the second avatar to assist the user with the content, which may provide a cue to the user to expect the second avatar to assist the user.

At 316, the second device may end a session with the avatar, such as by discontinuing display, at least temporarily, of the avatar, silencing the avatar, or otherwise discontinuing animation and sounds of the avatar at least until another user command for the avatar is received from the user. For example, the avatar may hide or disappear after a predetermined amount of inactivity.

FIG. 4 is a flow diagram of another illustrative process 400 of migrating an avatar and content from a first device to a second device using a remote computing device. The process 400 is described with reference to the environment 100 and may be performed by the first device 102, the second device 104, and remote computing device 110. Of course, the process 400 may be performed in other similar and/or different environments.

At 402, the remote computing device 110 may provide avatar data to the first device 102. For example, the first device 102 may receive a request for user support, activation of a control that starts the avatar, and/or any other event that triggers the avatar to assist the user. The remote computing device 110 may then provide avatar data, such as ASR and/or NLU support, a character profile, a voice profile, search results, and/or other avatar data to enable the first device 102 to present the avatar at 404 an to assist the user with tasks, answer questions, and/or perform other operations for the user, possibly including requesting content and/or performing searches.

At 406, the remote computing device 110 may transmit content to the first device 102, possibly in response to a request from the user facilitated through the avatar, via the avatar manager 230. For example, the remote computing device 110 may stream the content to the first device 102, may download the content to the first device, and/or may provide the content or portions thereof to the first device in other ways (e.g., virtual desktop, XML data, etc.). At 408, the first device 102 may present the content for the user, which may include causing the content to be displayed, causing content to be emitted via a speaker, or both. Other outputs are also possible, such as haptic and sensory outputs.

At 410, the remote computing device 110 may determine available devices which may receive a handoff of the content and the avatar. The devices may be determined by proximity to the first device, control by a user of the first device, type of device, and/or other information about the devices. For example, the remote computing device 110 may determine that the second device 104 is near the first device 102 and is available for use by the user of the first device. The determination may be performed by radio transceivers (e.g., Bluetooth®, near field communications, radio frequency identifiers (RFID), optical analysis, etc.) In some embodiments, the determination may be based on a pre-configuration of the devices, such as by registration of devices and relationships between the devices with the remote computing device 110.

At 412, the first device 102 may initiate a command to use the second device 104 to output the content. For example, the device determined to be available by the remote computing device 110 may be sent to the first device 102 to populate a listing of available devices. In some embodiments, the first device may receive a command to use the second device, possibly without access to the list, and possibly via a command provided to the avatar via the avatar module 214. In these embodiments, the remote computing device 110 may determine that the second device 104 is available prior to performing further processing, for example.

At 414, the remote computing device 110 may transfer data to the second device 104, such as content data and avatar data, which may be loaded into a buffer or other memory for playback by the second device. The operation 414 may not result in immediate playback, but may prepare the second device to enable playback, such as by "warming" the device with data that can be used to provide the content and the avatar in response to a handoff from the first device 102. At 416 the second device 104 may receive the data from the remote computing device 110.

At 418, the remote computing device 110 may cause the first device 102 to terminate the content and the avatar, possibly at different times or possibly at a same time. In some embodiments, the remote computing device 110 may provide data to the first device 102 to specify exit instructions, animation, an exit point, and so forth for causing the avatar to "exit" the first device 102. The presentation of the content and the avatar may be discontinued by the first device 102 at 420.

At 422, the remote computing device 110 may cause the second device 104 to initiate the avatar (e.g., cause rendering of the avatar, etc.) and the content, possibly at different times or possibly at a same time. In some embodiments, the remote computing device 110 may provide data to the first device 102 to specify entry instructions, animation, an entry point, and so forth for causing the avatar to "enter" the second device 104. In some embodiments, the avatar may be presented on the second device prior to presentation of the content. The avatar may then reveal or otherwise appear to open or bring in the content to the second device 104 through animation and/or sounds, which may create an interesting customer experience. The presentation of the content and the avatar may be initiated by the second device 104 at 424. At 426, a session with the avatar may be terminated or otherwise end after fulfillment of a request, a timeout, playback of the content, and/or in response to another trigger.

Figure 5:
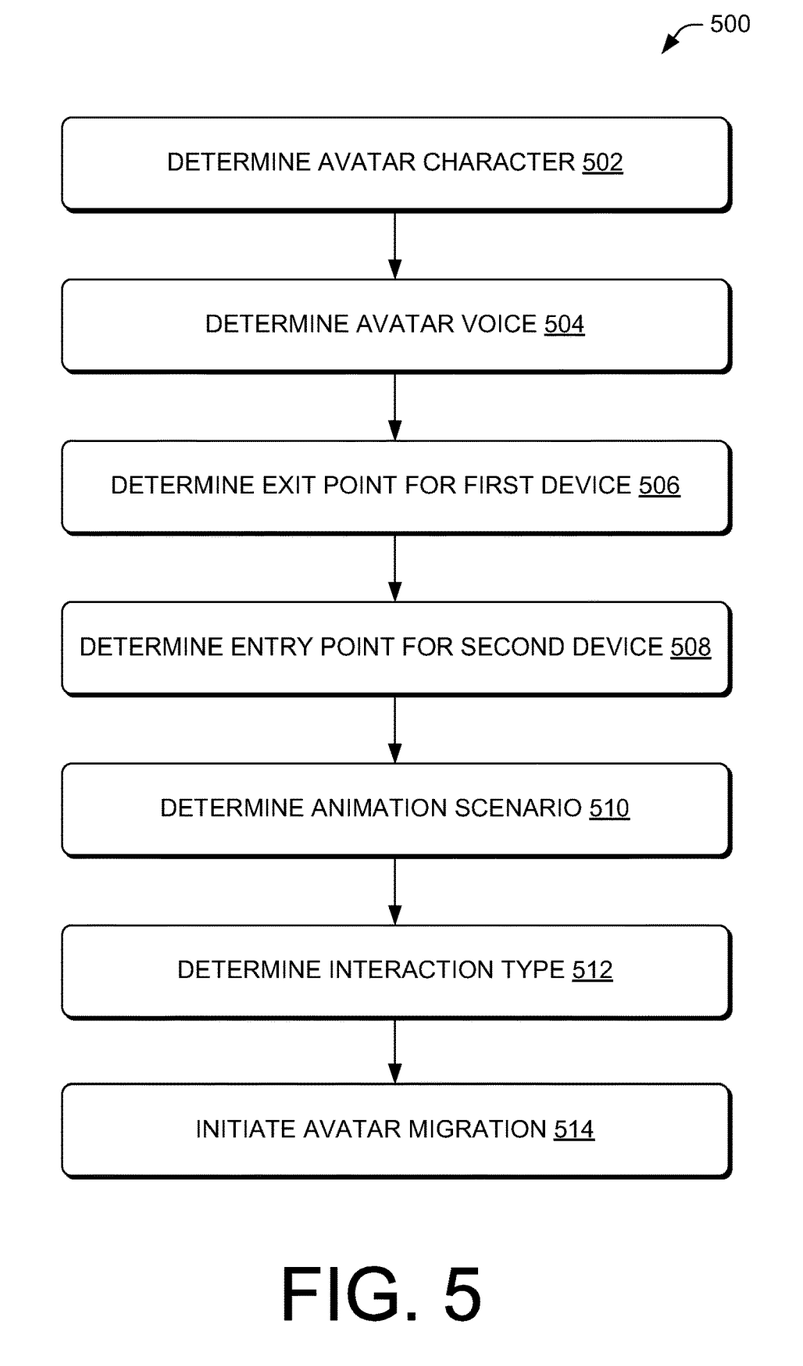
FIG. 5 is a flow diagram of an illustrative process of determining attributes and data to facilitate migration of an avatar.

FIG. 5 is a flow diagram of an illustrative process 500 of determining attributes and data to facilitate migration of an avatar. The process 500 is described with reference to the environment 100 and may be performed by the remote computing device 110 or one of the devices, such as the first device 102, the second device 104, or both. Of course, the process 500 may be performed in other similar and/or different environments. The process 500 may be used to determine data to generate the avatar by the avatar module 214 on the first device 102 prior to a handoff of the avatar, on the second device 104 after the handoff of the avatar, or both.

At 502, an avatar character may be determined from a character profile. For example, multiple different characters, each having at least some visual differences, may be used by the avatar module 214 to present the avatar. Avatars may be different by way of visual appearance (e.g., gender, animal type, object types, etc.).

At 504, an avatar voice may be determined from a voice profile. For example, multiple different voices may be available, which may include different pitches and other features, and thus may represent different genders, different ages, and so forth.

At 506, an exit point may be determined for the first device, which may be a location of the first device that the avatar "exits" via a visual display that ends display of the avatar on the first device. For example, the avatar may be depicted as walking into the right side of the display of the first device, and thus disappearing from the first device. The exit point may be a side of the display, a corner of the display, or any other location in the display of the first device.

At 508, an entry point may be determined for the second device, which may be a location of the first device that the avatar "enters" via a visual display that begins display of the avatar on the second device. For example, the avatar may be depicted as walking into the display of the second device from the left side of the display of the second device, and thus appearing in the display of the second device. The entry point may be a side of the display, a corner of the display, or any other location in the display of the second device. In some embodiment, the entry and exit points may be coordinated based on a relative position of the first device 102 and the second device 104 and/or on logical or arbitrary considerations (e.g., exit right and then appear on left, exit on the bottom and then appear on the bottom (or top), etc.).

At 510, an animation scenario may be determined. The animation scenario may be an animation sequence used to depict the exit and entry of the avatar on respective devices. Non-limiting example animation scenarios include the avatar walking from one display to another, jumping between displays, swinging between displays, being projected (e.g., via a cannon, etc.) to the other display, climbing a ladder to travel between displays, riding a vehicle (e.g., train, elevator, etc.) between displays, digging a hole to get to the other display, curtains closing on a first device and then opening on a second device, and so forth.

At 512, an interaction type may be determined for the avatar. Some avatars may interact with a user in response to wake words, which, when processed, may alert the avatar module 214 that a command is forthcoming Some avatars may interact by dialog, which may carry over prior questions or information. An example may be receipt of the term "play next", which may rely in part on a prior command to understand what to play. The interaction type may be selected for use by the first device and the second device, possibly to provide consistency between the devices during interaction by a user with the avatar.

At 514, a migration of the avatar may be initiated using at least some of the data from the operations 502-512 discussed above.

Figure 6:
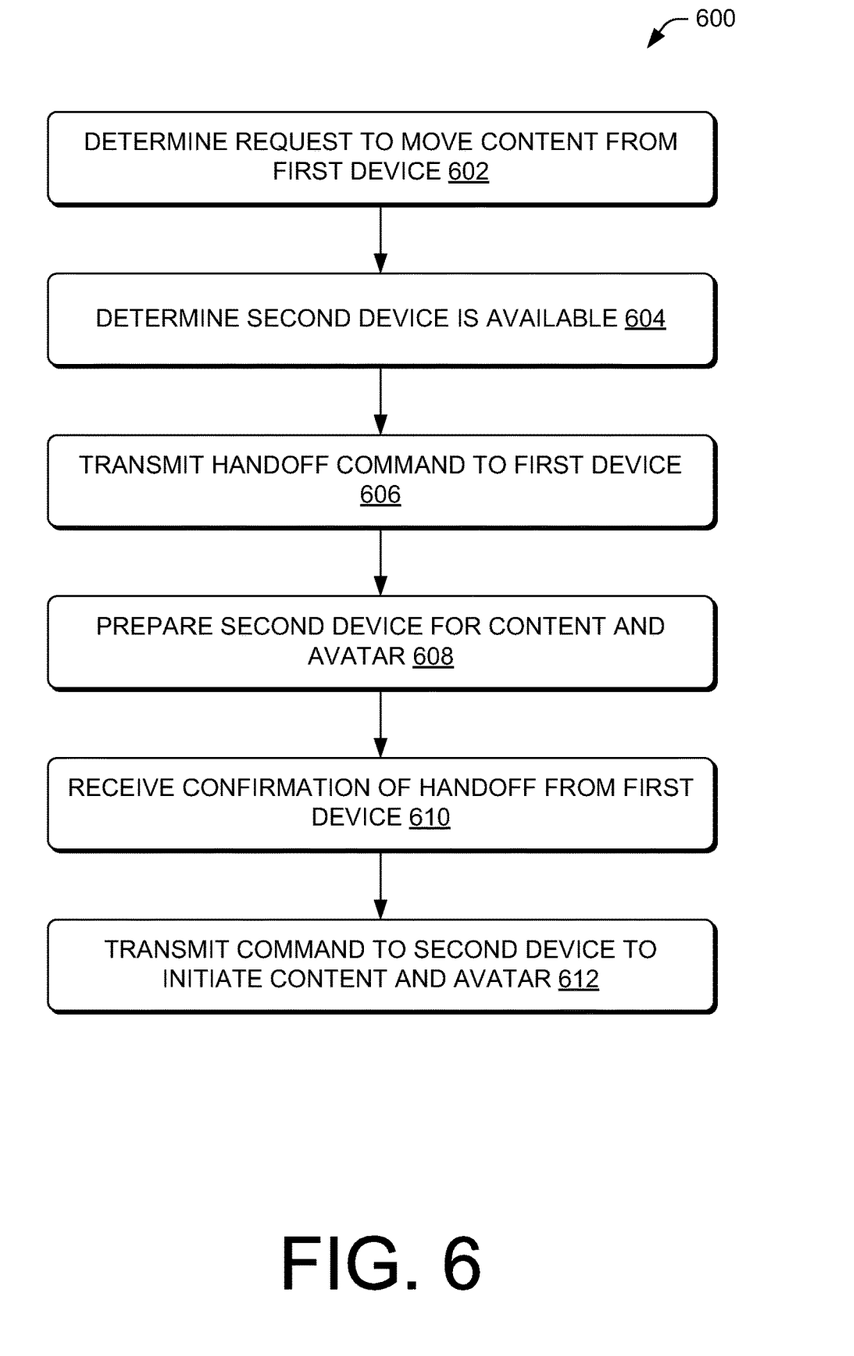
FIG. 6 is a flow diagram of an illustrative process of coordinating a handoff of content and migration of an avatar from a first device to a second device.

FIG. 6 is a flow diagram of an illustrative process 600 of coordinating a handoff of content and migration of an avatar from a first device to a second device. The process 600 is described with reference to the environment 100 and may be performed by the remote computing device 110. Of course, the process 600 may be performed in other similar and/or different environments.

At 602, the remote computing device 110 may determine a request to move content from the first device 102 to another device, such as the second device 104. The request may be initiated by the first device, by user interaction with the avatar, which may be determined via an ASR operation by the remote computing device 110, and/or by other triggering events (e.g., turning on the second device, etc.).

At 604, the remote computing device 110 may determine that the second device is available and may be used to receive the content that was previously presented by the first device 102.

At 606, the remote computing device 110 may transmit a handoff command to the first device to cause the first device to perform a handoff. The handoff command may include information to cause the first device 102 to handoff the avatar. The handoff information may include the exit point, the animation scenario, and/or other information used by the first device to discontinue the avatar on the first device.

At 608, the remote computing device 110 may prepare the second device with the content and the avatar. For example, the remote computing device 110 may download or fill a buffer of the second device with the content and/or provide information about a position within the content, for example. The remote computing device 110 may provide handoff information about the avatar which may include the entry point, the animation scenario, and/or other information used by the second device to initiate the avatar on the second device.

At 610, the remote computing device 110 may receive confirmation of the handoff from the first device, which may confirm that the first device has terminated or discontinued display or other presentations of the avatar. In some embodiments, the confirmation may provide an indication that a termination sequence has be initiated, which may be synchronized or timed with an entrance sequence of the second device.

At 612, the remote computing device 110 may transmit a command to the second device to cause the second device to initiate the avatar on the second device. The avatar may be initiated using the data provided at the operation 608 that may provide the entrance point, animation scenario, and so forth.

Figure 7:
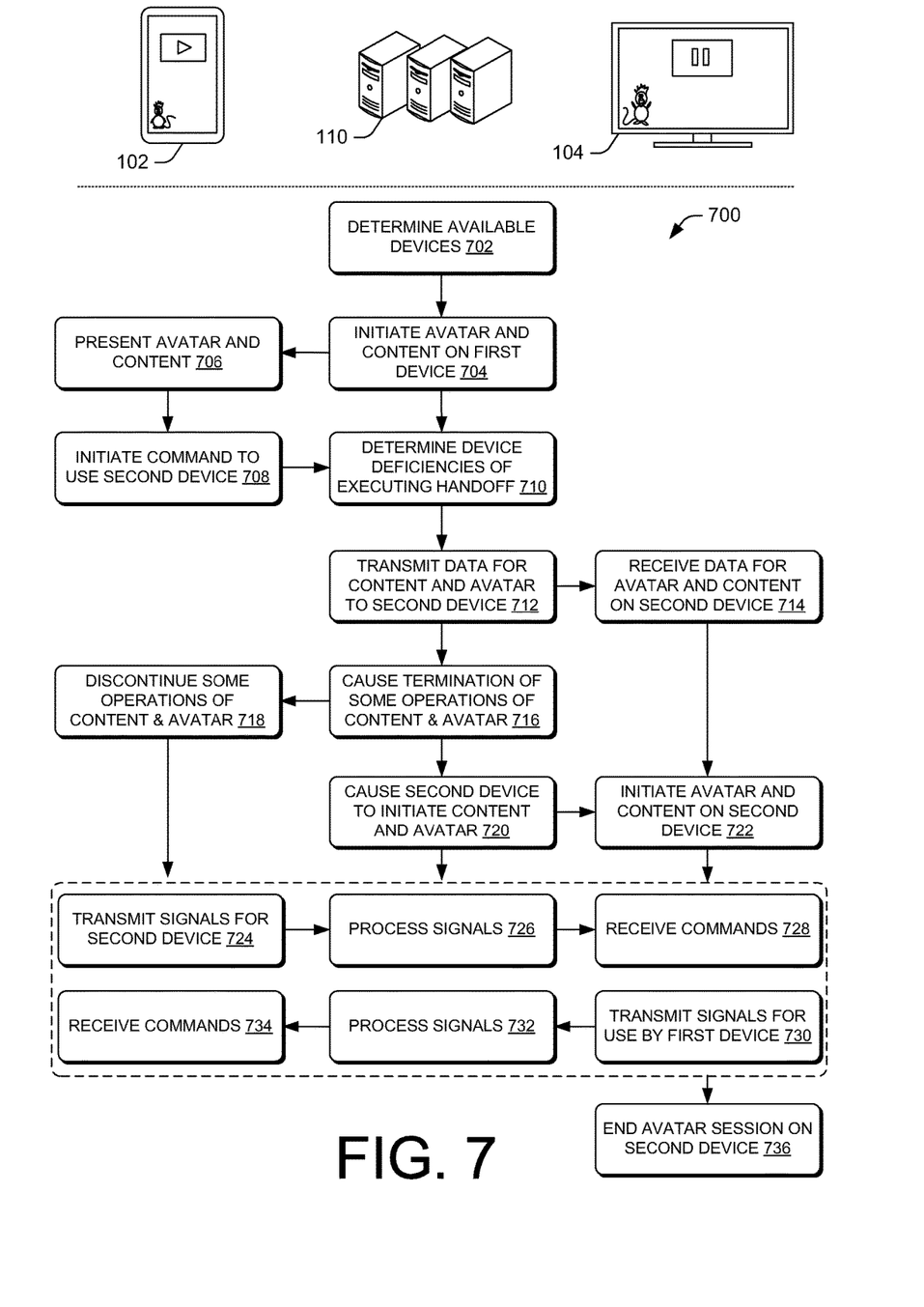
FIG. 7 is a flow diagram of an illustrative process of coordinating a partial handoff of content and migration of an avatar, where the first device continues to perform at least one operation for the content and/or the avatar at least temporarily after the handoff.

FIG. 7 is a flow diagram of an illustrative process 700 of coordinating a partial handoff of content and migration of an avatar, where the first device continues to perform at least one operation for the content and/or the avatar at least temporarily after the handoff. The process 700 is described with reference to the environment 100 and may be performed by the first device 102, the second device 104, and remote computing device 110. Of course, the process 700 may be performed in other similar and/or different environments.

At 702, the remote computing device 110 may determine devices that are available to receive content from other devices using at least the techniques discussed above. The determination may further include determining hardware, such as input components and output components available for the devices. For example, the remote computing device 110 may determine that the first device includes a microphone and high quality speakers and the second device includes a display, but no microphone and lower quality speakers (relative to the speakers of the first device).

At 704, the remote computing device 110 may initiate the avatar and the content on the first device, such as by causing the first device to execute respective modules that provide such content. In some embodiments, the remote computing device 110 may stream data to the first device to provide the content. The remote computing device 110 may provide ASR services, NLU services, and/or other data services to the first device, which may be used by the avatar module 214 to facilitate generation and presentation of the avatar. At 706, the first device 102 may present the avatar and the content. The avatar may be presented prior to the content, or vice versa.

At 708, the first device 102 may initiate a command to use the second device to present the content and the avatar. For example, the avatar module 214 may receive a command from the user, via an audio file or audio stream, to "move the content to the television" or another similar type of command that initiates a handoff of the content, and also of the avatar.

At 710, the remote computing device 110 may determine device deficiencies of the second device that may hinder playback or interaction with the content and/or the avatar, possibly using the information determined at the operation 702. For example, the remote computing device 110 may determine that the second device lacks a microphone that would normally be used to receive voice commands from the user for use by the avatar module 214. The remote computing device 110 may determine that the second device include speakers of a lesser quality than speakers included in the first device.

At 712, the remote computing device 110 may transmit data for the content and the avatar to the second device to enable the second device to playback and/or process the content and the avatar. The information may include the entry point, animation scenario, character profile, voice profile, and/or other avatar information. At 714, the second device 104 may receive the data associated with the content and the avatar.

At 716, the remote computing device 110 may cause the first device to terminate at least some operations of the content and avatar. The remote computing device 110 may transmit the exit point, animation scenario, and/or other relevant information to the first device. However, the remote computing device 110 may not cause termination of all operations, such as use of a microphone of the first device and/or use of the speakers of the first device. In some embodiments, the remote computing device 110 may request the first device 102 to keep the microphone and/or the speakers available for use, at least temporarily, after the handoff of the content and the avatar to the second device. At 718, the first device may discontinue some of the operations while maintaining at least some operations, such as use of the microphone to receive signals from speech by the user and speakers that emit sound as a result of signals from the content.

At 720, the remote computing device 110 may cause the second device to initiate the content and the avatar, as discussed above, which may be initiated by the second device at 722.

At 724, the first device may transmit signals for use by the second device 104, possibly via processing by the remote computing device 110. For example, the first device 102 may transmit signals generated by a microphone to the remote computing device 110. At 726, the remote computing device 110 may process the signals generated at 724 to determine commands for the avatar. For example, an ASR and NLU process may be performed by the avatar manager 230, which may generate commands for output by the second device 104. At 728, the second device may receive the commands, which may be used to output information by the second device. The commands may be to change an attribute of the content (e.g., stop the movie), interact with other content, request information, and so forth. Thus, the operations 724 to 728 may enable the microphone or another input component of the first device to pass information to the second device for use by the second device while providing the avatar and/or the content.

At 730, the second device may transmit a signal for use by the first device, possibly via processing by the remote computing device 110. For example, the second device may transmit signals output from the avatar and/or the content, such as audio signals for use by speakers to emit sound. At 732, the remote computing device 110 may processes the signals; however, processing may not be needed. In some embodiments, the signals may be passed directly to the first device 102 without traveling through the remote computing device 110. At 734, the first device may receive the signals and process the signals accordingly. For example, the first device may emit sound by speakers in response to receipt of the signals at the operation 734. Although the examples described above include use of a microphone and speakers of the first device, other hardware may be used, singly or in combination, to enable interaction and/or improve a customer experience after migrating the content and avatar to the second device.

At 736, the second device 104 may terminate or otherwise end a session with the avatar after fulfillment of a request, a timeout, playback of the content, and/or in response to a trigger.

Figure 8:
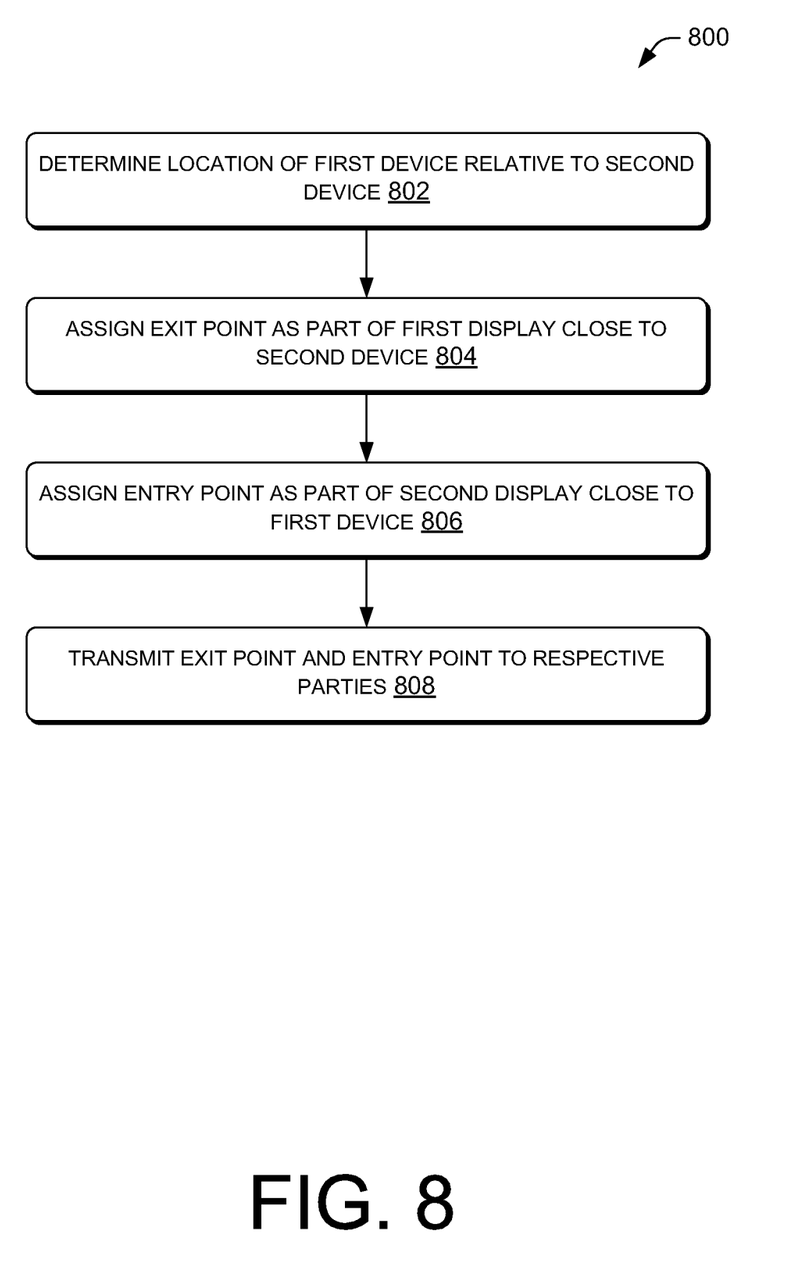
FIG. 8 is a flow diagram of an illustrative process of determining an exit point on a first device and an entry point on second device that are used to animate the migration of an avatar between the devices.

FIG. 8 is a flow diagram of an illustrative process 800 of determining an exit point on a first device and an entry point on second device that are used to animate the migration of an avatar between the devices. The process 800 is described with reference to the environment 100 and may be performed by the remote computing device 110 or one of the devices, such as the first device 102, the second device 104, or both. Of course, the process 800 may be performed in other similar and/or different environments.

At 802, a location of first device relative to the second device 104 may be determined. For example, the first device may use beamforming to determine a location of the second device based on sound emitted by the second device. As another example, the first device may determine a location of the second device based on imagery captured by the first device of the second device. In some embodiments, the determination may be based on user input. In some embodiments, an internet protocol (IP) address or other designator may be associated with devices that are within a predetermined proximity of one another. For example, when a television is known to be located near a tablet device, the television's IP address may be associated with the tablet by a remote device, by the tablet, by the television, or by another device. The association may enable any of these devices to understand which television is meant in a command to move content to or from the television.

At 804, the first device may assign an exit point for the avatar as a part of a first display of the first device that is close to the second device. For example, if the first device is arranged to the left of the second device from a vantage point of a user, the exit point may be assigned to the right side of the first display. The exit point may be a point where the avatar exits the first display as discussed above.

At 806, the entry point may be assigned as part of a second display that is close to the first device. In the above example discussed with respect to the operation 804, the part of the second display may be the left side of the second display. The entry point may be appoint where the avatar appears to enter the second display as discussed above.

At 808, the exit point and the entry point may be transmitted to respective devices for use by the avatar module 214. For example, the first device may cause the avatar to exit at the exit point when performing a handoff of the avatar to the second device. The second device may then use the entry point to depict entry of the avatar on the second device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a display screen;
a microphone;
one or more processors; and
memory to store computer-executable instructions that, when executed, cause the one or more processors to:
receive data by an electronic device that includes the display screen, the microphone, the processors, and the memory;
present animated user assistance including an animated avatar on the display screen;
receive audio data from the microphone;
send the audio data to a remote device to perform automated speech recognition on the audio data;
receive a response from the remote device based on the audio data, the response including a command to provide content on a television located proximate the electronic device;
determine a location of the television relative to the electronic device;
present, on the display screen, new animated user assistance associated with the response, wherein the new animation includes animation that moves the animated avatar from a first portion of the display screen that is further from the location of the television to a second portion of the display screen that is closer to the location of the television;
send second data to the television to cause the television to render the animated avatar that continues to provide the new animated user assistance; and
terminate the presentation of the new animated user assistance on the display screen prior to the television providing the new animated user assistance.

2. The system as recited in claim 1, further comprising the television including:
a television display;
television processors; and
television memory to store computer-executable instructions that, when executed, cause the television processors to:
present the new animated user assistance including the animated avatar on the television screen;
receive, from the electronic device or the remote device, an indication of the content to be displayed on the television display; and
present the content on the television display in association with the new animated user assistance of the animated avatar.

3. The system as recited in claim 1, wherein the computer-executable instructions further cause the one or more processors to:
receive additional audio data from the microphone of the electronic device after presenting the content on the television display;
send the additional audio data to the remote device to perform automated speech recognition on the additional audio data;
receive an additional response from the remote device based on the additional audio data; and
send at least the additional response to the television; and
wherein the computer-executable instructions further cause the television processors to present further animated user assistance on the television display based at least in part on the response.

4. The system as recited in claim 1, wherein the computer-executable instructions further cause the one or more processors to:
send at least one of radio communication or optical communication between the electronic device and the television to determine the location of the electronic device relative to the television;
select, for an animation exit location, the second portion of the display screen as a location to terminate the animation,
select, for an animation entry location, a first portion of a television display of the television; and
send the animation entry location to the television.

5. A computer-implemented method executable by a remote computing device to send an avatar from a first device to a second device to provide continued animated user assistance, the method comprising:
sending, via the remote computing device, first data to the first device to cause the first device to render the avatar that provides animated user assistance;
causing playback of content on the first device prior to playback of the content on a second device;
receiving a request from the first device to display the content on the second device;
determining an address of the second device that is associated with the first device;
determining the second device is available to display the content;
causing the first device to terminate output of the avatar;
sending second data to the second device at the address to cause the second device to render the avatar that continues to provide the animated user assistance; and causing the first device to terminate the playback of the content prior to the second device providing the animated user assistance.

6. The method as recited in claim 5, further comprising:
receiving audio signals from a microphone of the first device after the causing the first device to terminate output of the avatar;
processing the audio signals to generate a user request;
determining a response to the user request; and
sending at least the response to the second device for animated output by the avatar.

7. The method as recited in claim 5, further comprising sending the audio signals associated with the content to the first device for playback by speakers of the first device concurrent with visual playback of the content by the second device.

8. The method as recited in claim 5, further comprising:
sending exit instructions to the first device to cause the avatar to perform exit animation to depict an exit from the first device;
sending entry instructions to the second device to cause the avatar to perform entry animation to depict an entry into the first device, and
wherein the exit animation depicts a same type of animated movement as the entry animation.

9. The method as recited in claim 8, further comprising:
determining a position of the first device relative to the second device;
selecting, for the exit, an exit point associated with the first device that is based on the position of the first device relative to the second device; and
selecting, for the entry, an entry point associated with the second device that is based on the position of the second device relative to the first device.

10. The method as recited in claim 8, further comprising providing the animated movement as at least one of a jumping animated movement or a walking animated movement.

11. The method as recited in claim 5, further comprising sending avatar data to the second device that includes at least a visual character profile of the avatar and a voice profile of the avatar.

12. The method as recited in claim 5, further comprising sending avatar data to the second device that includes at least some historical data associated with animation of the avatar depicted by the first device.

13. The method as recited in claim 5, further comprising:
determining a position of the first device relative to the second device using at least one of radio communication or optical communication sent between the first device and the second device.

14. The method as recited in claim 5, further comprising:
playing the content on the first device;
determining a playback location of the content on the first device prior to terminating the content on the first device; and
sending the content to the second device based at least in part on the playback location.

15. The method as recited in claim 5, further comprising performing automated speech recognition of an audio file received from the first device to determine the request.

16. The method as recited in claim 5, further comprising causing the avatar to perform an animated sequence to introduce the content on the second device.

17. A system comprising:
one or more processors; and
memory to store computer-executable instructions that, when executed, cause the one or more processors to:
send data to a first avatar component executing on a mobile electronic device, the first avatar component to provide animated user assistance depicted by an avatar;
receive audio from the mobile electronic device, the audio including a command to display content on another device and a device designation of a second device;
send first data to the first device to cause the first device to terminate display, by the first avatar component, of the avatar;
send second data to the second device to cause the second device to begin providing animated user assistance, by a second avatar component, and depicted by the avatar; and
cause the first device to terminate the display of the avatar prior to the second device providing the animated user assistance.

18. The system as recited in claim 17, wherein the computer-executable instructions further cause the one or more processors to send the content to the second device for display with the avatar.

19. The system as recited in claim 17, wherein the computer-executable instructions further cause the one or more processors to cause the first device and the second device to render a same avatar having at least one of a same visual representation or a same audible output as a voice associated with the avatar.

20. The system as recited in claim 17, wherein the computer-executable instructions further cause the one or more processors to process at least some data received form the first device to facilitate providing the animated user assistance by the second avatar component.

* * * * *